(12) United States Patent
Bauer et al.

(10) Patent No.: US 6,640,577 B2
(45) Date of Patent: Nov. 4, 2003

(54) DISPENSING STATION

(75) Inventors: Roger J. Bauer, Woodville, WI (US); Mark T. Manders, Lino Lakes, MN (US); Dennis E. Saathoff, Hudson, WI (US)

(73) Assignee: Nor-Lake, Incorporated, Hudson, WI (US)

( * ) Notice: Subject to any disclaimer, the term of this patent is extended or adjusted under 35 U.S.C. 154(b) by 0 days.

(21) Appl. No.: 10/052,576

(22) Filed: Jan. 18, 2002

(65) Prior Publication Data

US 2003/0136144 A1 Jul. 24, 2003

(51) Int. Cl.[7] ................................................. B67D 5/62
(52) U.S. Cl. .................... 62/390; 222/146.1; 222/146.6
(58) Field of Search ........................... 62/390, 393, 396, 62/400; 222/129.1, 146.1, 146.6

(56) References Cited

U.S. PATENT DOCUMENTS

| 4,193,522 A | * | 3/1980 | Edelbach ..................... 222/145 |
| 4,842,166 A | * | 6/1989 | Van Zijverden .......... 222/129.2 |
| 5,159,818 A | * | 11/1992 | Etou et al. ..................... 62/137 |
| 5,797,519 A | * | 8/1998 | Schroeder et al. ........ 222/129.1 |
| 5,992,685 A | * | 11/1999 | Credle, Jr. ...................... 222/1 |
| 6,546,843 B2 | * | 4/2003 | Ugolini ......................... 99/275 |

* cited by examiner

Primary Examiner—Melvin Jones
(74) Attorney, Agent, or Firm—IPLM Group, P.A.

(57) ABSTRACT

A self-contained juice dispensing station (10) is provided for use with a mixer (190). The station (10) includes a liner (20) having a cavity (21). A plurality of containers holding the liquid concentrate or juice are positioned in the cavity (21) on trays (25). A mixer housing (70) is operatively connected to the liner (20) and has a cavity (77) for positioning a mixer (190). An ice bin is removably connected to the station (10). A plurality of pumps (90–93) are positioned in the station for pumping the liquid, thereby forming a self-contained ice cube/juice/mixer station.

11 Claims, 13 Drawing Sheets

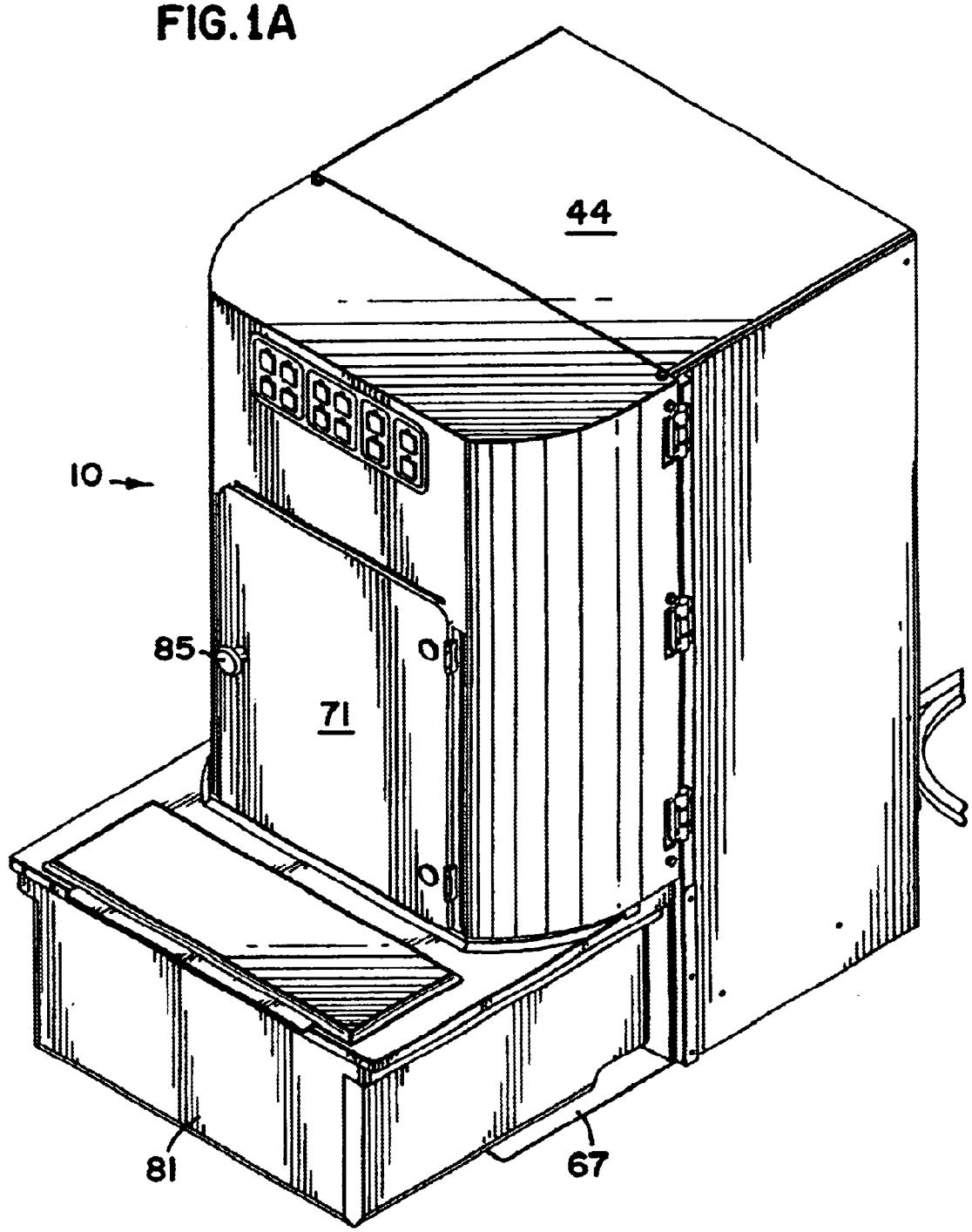

FIG. 2B
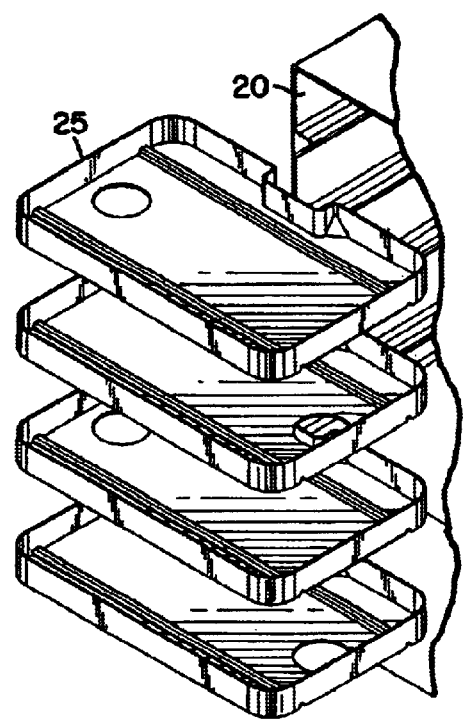
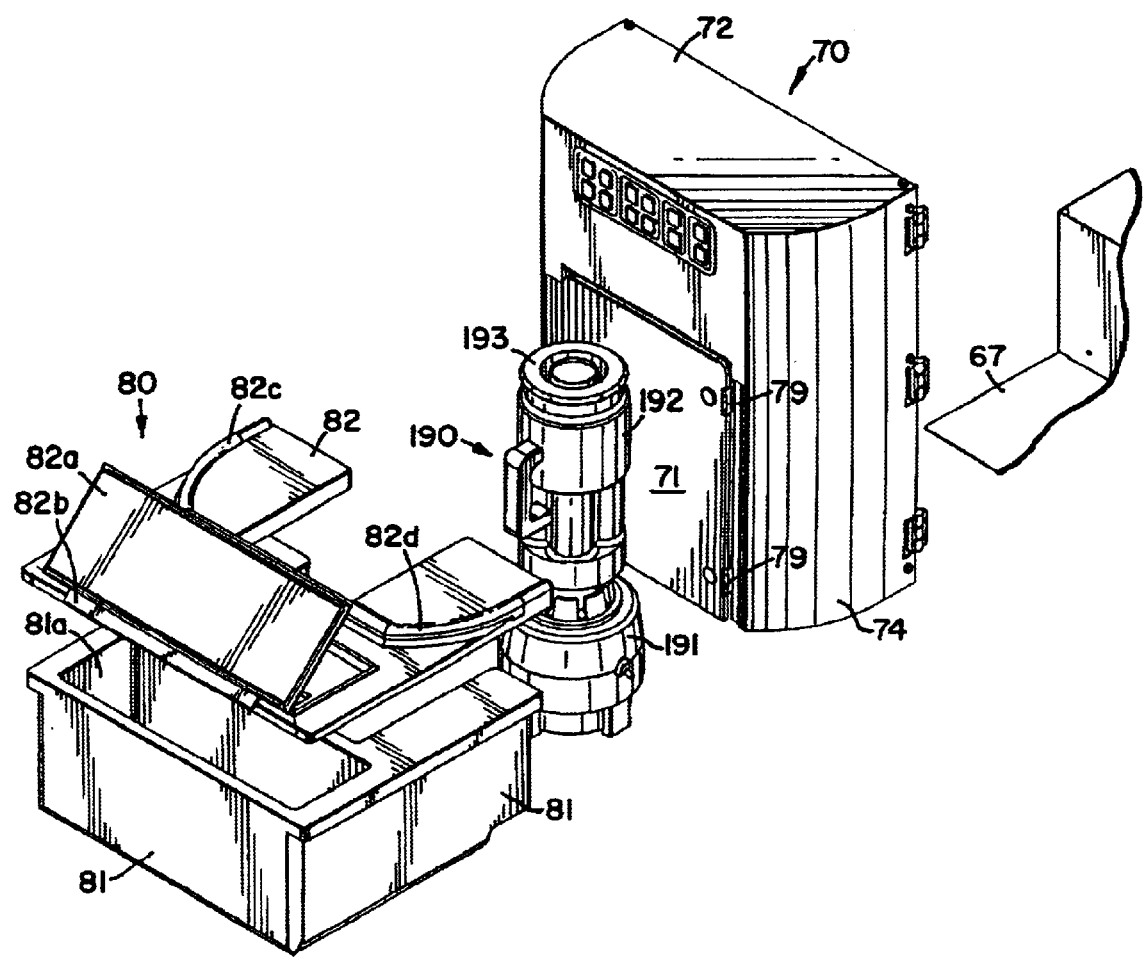

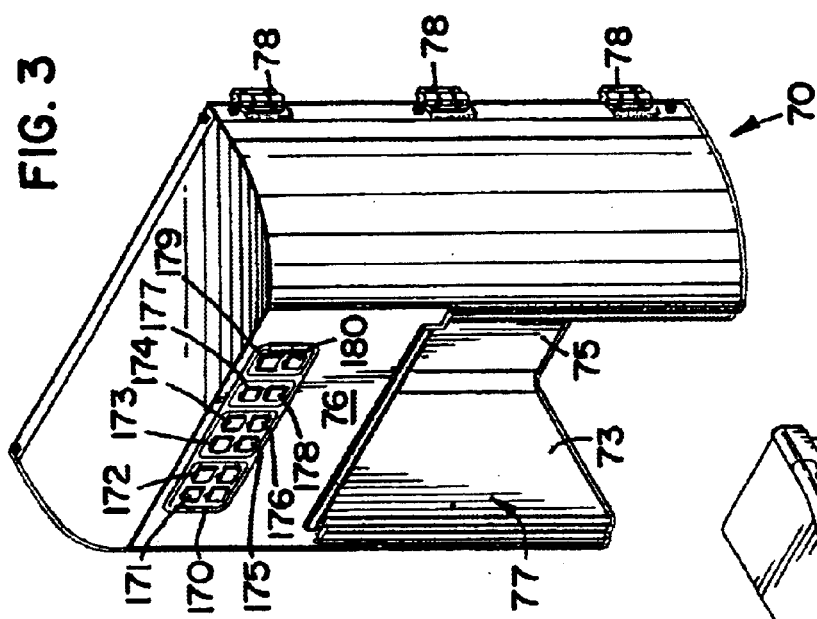
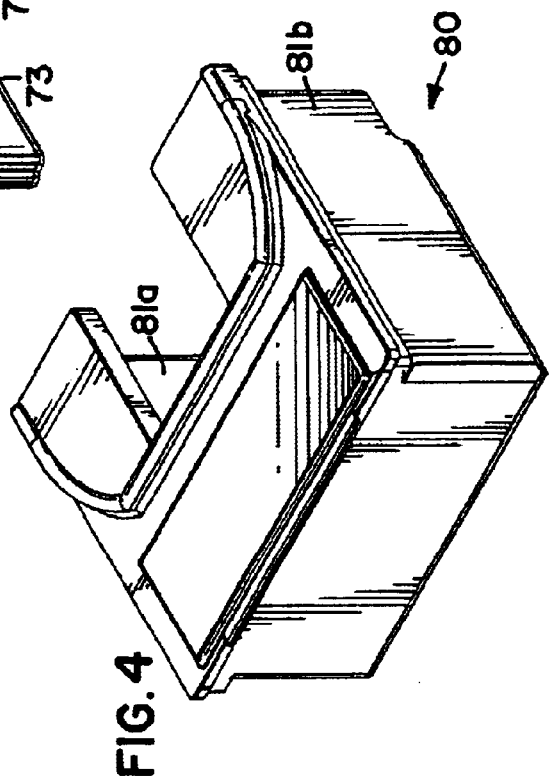

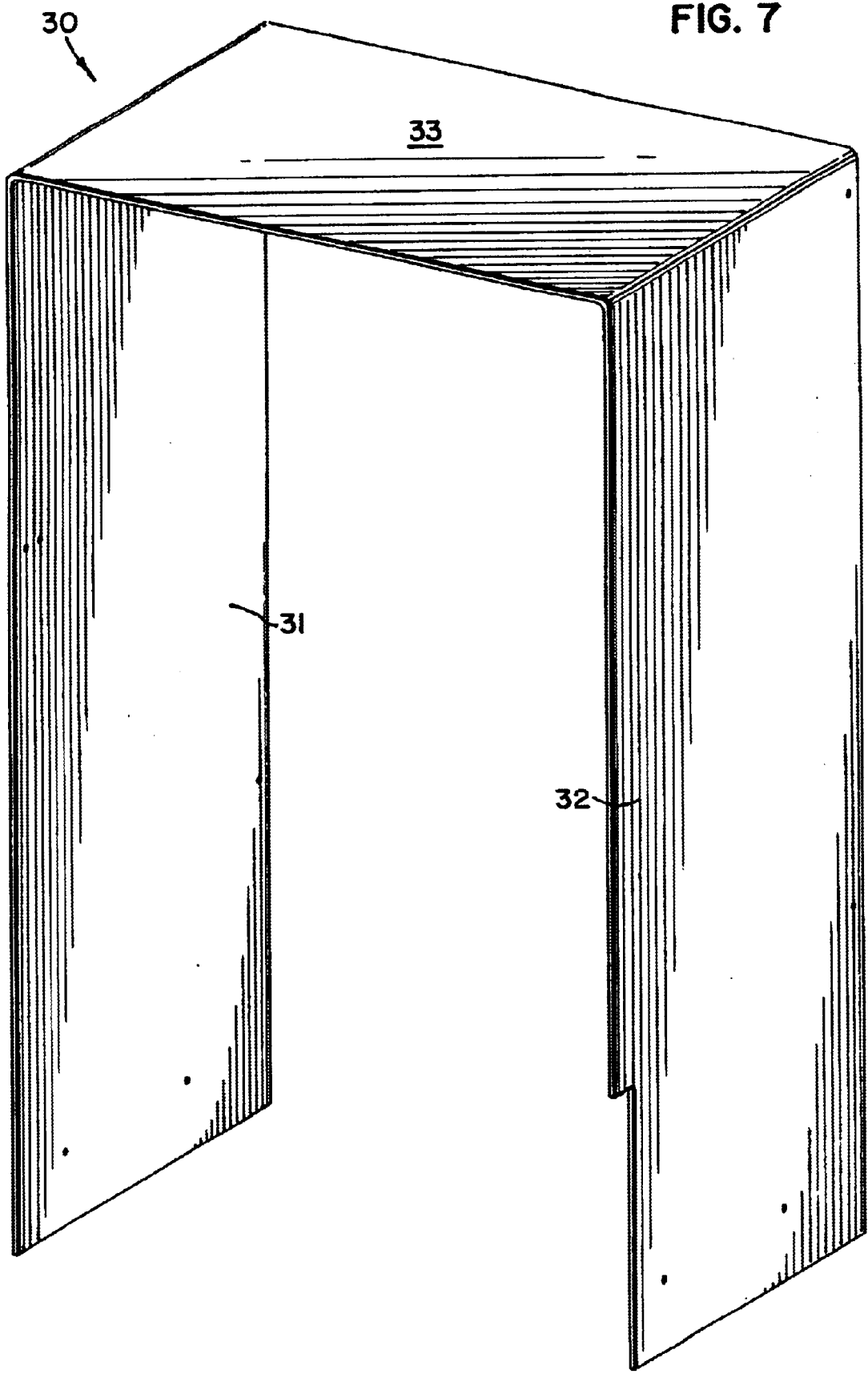

DISPENSING STATION

BACKGROUND OF THE INVENTION

1. Field of the Invention

This invention relates generally to a dispensing station and more particularly to a self-contained dispensing station which is utilized to prepare a liquid/ice drink.

2. Description of the Prior Art

The sale of ice blended fruit drinks, often referred to as "smoothies" has proved to be a popular drink. While popular with the consumers, such drinks have created problems for the retailer. This is especially true if the sale of the smoothies is not the major purpose of the retailer. That is, a smoothie requires ice, a juice concentrate, and a mixer. Having all of these components at a single location has proven to be difficult. Further, it has been difficult to size these units to a countertop size.

The present invention addresses the problems associated with the prior art devices and provides for a self-container liquid/ice blending station.

SUMMARY OF THE INVENTION

In one embodiment, the invention is a self-contained juice dispensing station for use with a mixer. The station includes a liner having a cavity. The liner is adapted and configured to hold a plurality of containers having a liquid. The liner has an open front. A mixer housing is operatively connected to the liner. The housing is proximate the front of the liner and the mixer housing has a cavity for positioning the mixer. An ice bin is removably connected to the station. A plurality of pumps are positioned in the station for pumping liquid from the containers, thereby forming a self-contained ice cube/juice/mixer station.

In another embodiment, the invention is a self-contained juice dispensing station for use with a mixer. The station includes a liner having a cavity. The liner is adapted and configured to hold a plurality of containers having a liquid. The liner has an open front. A mixer locator is operatively connected to the liner. The locator is adapted and configured to properly locate a mixer. A plurality of quick connect/disconnect valves are adapted and configured to be connected to the containers. The pumps are downstream of the quick connect/disconnect valves. Gas supply lines are operatively connected to the pumps to power the pumps and solenoids are operatively connected downstream to the pumps to control flow of the liquids from the containers. A mixer housing is operatively connected to the liner. The housing is proximate the front of the liner and the mixer housing has a cavity for positioning the mixer. An ice bin is removably connected to the station. A plurality of pumps are positioned in the station for pumping liquid from the containers, thereby forming a self-contained ice cube/juice/mixer station.

BRIEF DESCRIPTION OF THE DRAWINGS

FIG. 1a is a front perspective view of the dispenser of the present invention;

FIG. 2b is an exploded perspective view of the remainder of the dispenser shown in FIG. 1;

FIG. 3 is a perspective view of the mixer housing, shown in FIG. 1, without a door;

FIG. 4 is a perspective view of the assembled ice bin shown in FIG. 1;

FIG. 7 is a perspective view of the shell shown in FIG. 1;

DETAILED DESCRIPTION OF THE PREFERRED EMBODIMENT

Figure 1B:
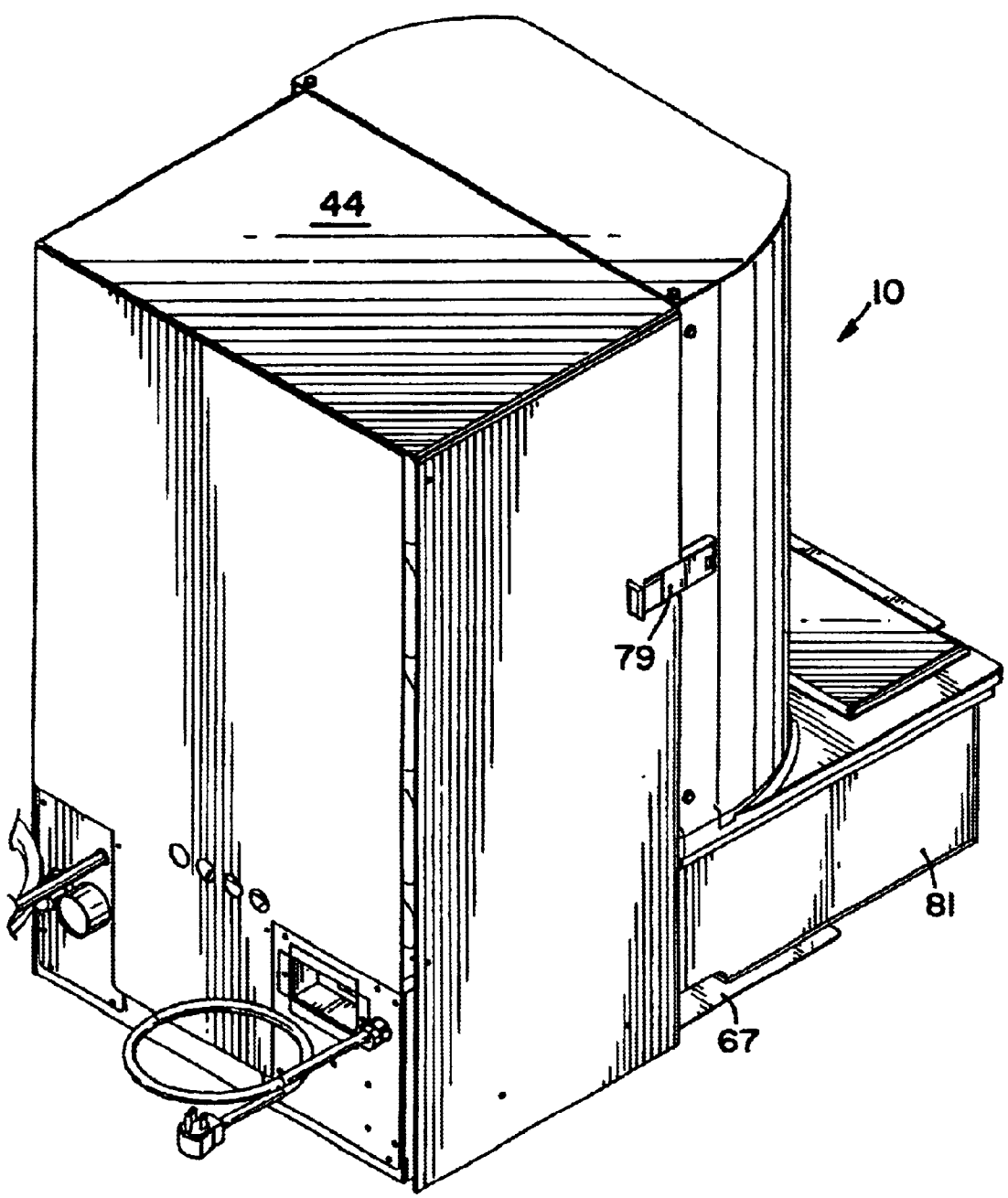
FIG. 1b is a rear perspective view of the dispenser of the present invention.
Figure 2A:
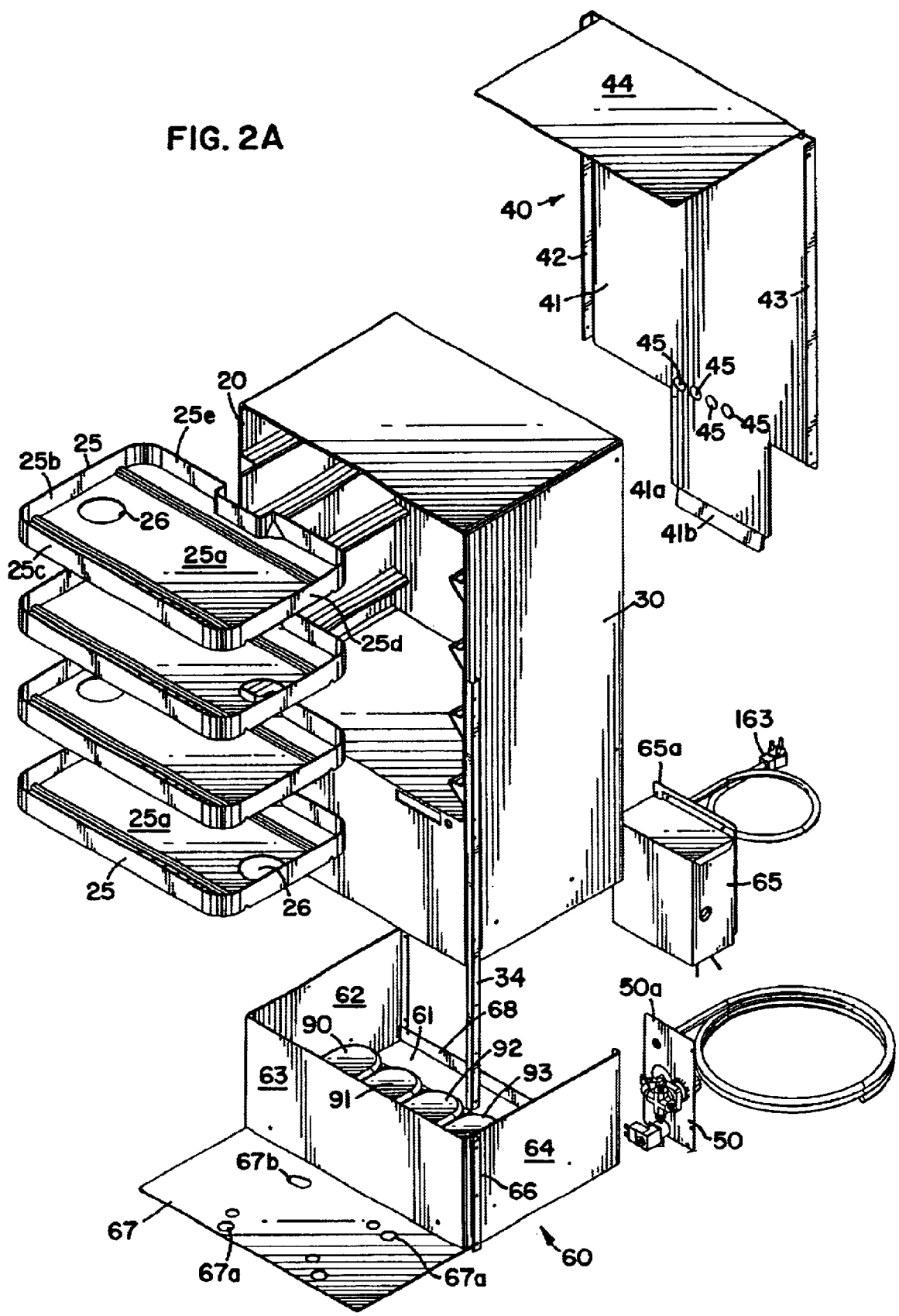
FIG. 2a is an exploded perspective view of a portion of the dispenser shown in FIG. 1.

Referring to the drawings, wherein like numerals represent like parts throughout the several views, there is generally shown a dispenser, generally designated as 10. FIGS. 1a and 1b show the assembled dispensing station 10. FIGS. 2a and 2b are an exploded perspective view of the component parts of the dispensing station 10.

Figure 6:
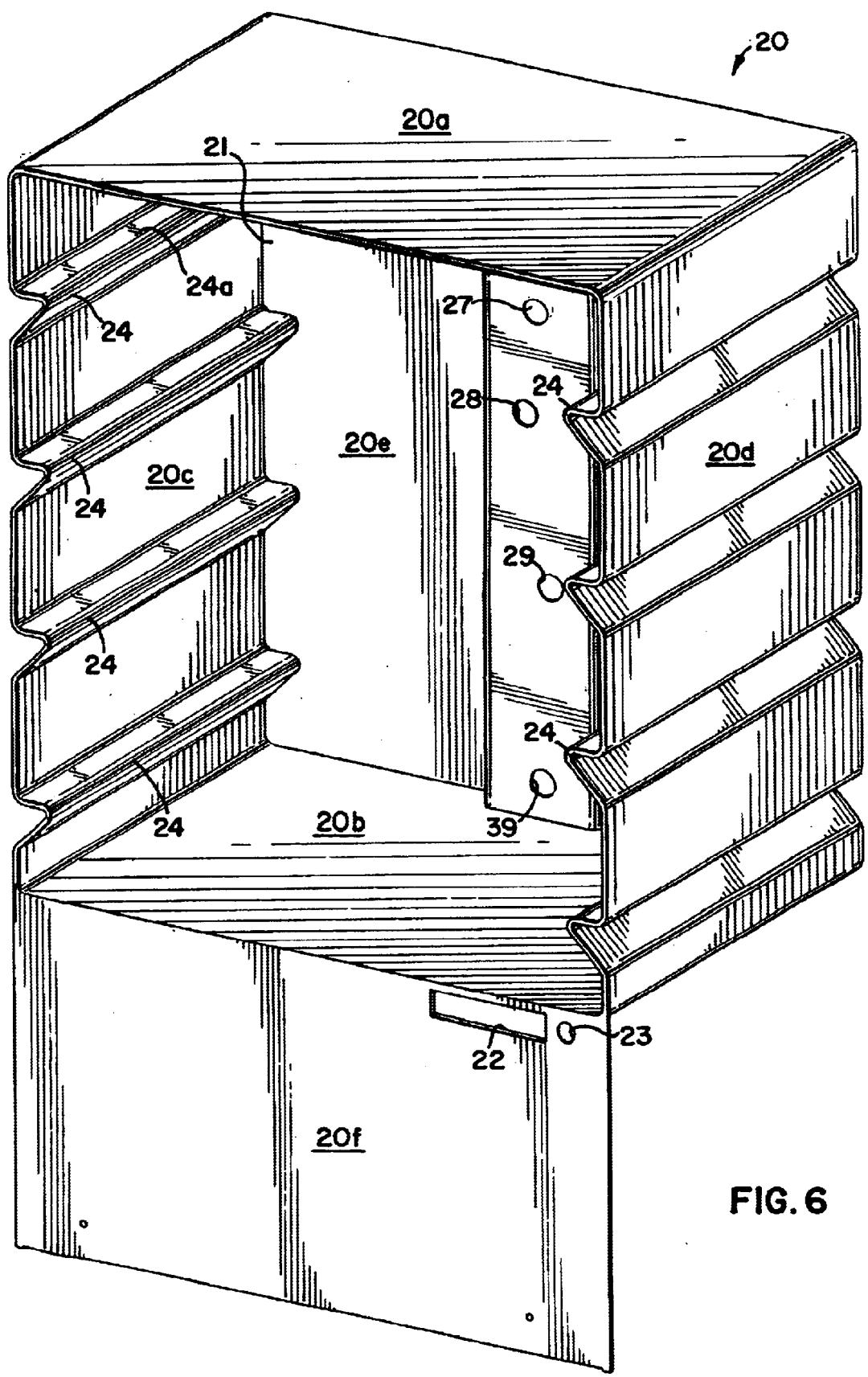
FIG. 6 is a perspective view of the liner shown in FIG. 1.

A liner 20, shown in detail in FIG. 6, includes a top 20a connected to a bottom 20b by side walls 20c, 20d and a back 20e. The liner 20 therefore forms an open rectangular shape having an inner cavity 21 formed between the sides 20c, 20d, bottom 20b, top 20a and back 20e. The liner 20 defines the cavity 21 that has an open front. A front face 20f extends downward from the front of the bottom 20b and has a rectangular opening 22 and a circular opening 23 formed therein. The liner 20 thus far described is preferably an integral one-piece unit and is preferably thermoformed from a suitable material such as ABS, although other suitable materials and manufacturing techniques may be utilized. By being formed as an integral one-piece unit and having the bottom 20b not have any openings, the mechanical and electrical components, to be described hereafter, which are situated below the bottom 20b are protected from liquid spills and liquid cleaners. Four tray supports 24 are formed on the side 20c and four similar tray supports 24 are formed on the side 20d. The tray supports 24 are in pairs of horizontal alignment and have a flat planar surface 24a to allow for trays 25 to be moved in and out and supported thereby. The trays 25 have a bottom 25a surrounded by four sides 25b–25e. A circular opening 26 is formed in the bottom 25a. The opening 26 is formed on opposite sides as compared to the tray adjacent it so as to more easily route the hoses, which will be described in more detail hereafter. Four openings 27, 28, 29 and 39 are formed in the back 20e of the liner 20.

A three-sided shell 30 is shown in FIG. 7. The shell 30 includes a first side 31 connected to a second side 32 at their top end by a top 33. The shell is secured to the liner 20 by suitable means, such as a solvent, such as methylene chloride. The shell 30 provides two functions. The first is cosmetic to hide the indentations formed by the tray supports 24. The second is to provide for a better and more easily cleaned dispenser 10. A post 34 is secured along the front of the second side 32 by suitable means such as screws (not shown). The post 34 extends below the bottom of side 32 and the bottom of the front face 20f. The shell 30 is formed from any suitable material such as ABS, the same as the liner 20. A back assembly 40 includes a planar member 41 having two angled sides 42, 43. The sides 42, 43 are used to secure the back 40 to the shell liner 30 by suitable means such as screws (not shown). A top member 44 is connected to the planar member 41 and the top member 44 is sized to fit over and on top of the top 33 of the shell 30. Four holes 45 are formed in the planar member 41. The holes 45 are at an elevation which is below the bottom 20b. Below the holes 45 is a rectangular projection 41a, which is utilized with respect to the lower housing unit 60, as will be described more fully hereafter.

The lower housing unit 60 includes a base 61 having side walls 62, 64 operatively connected thereto. A front wall is also operatively connected to the base 61 and is positioned between the side walls 62, 64. This forms an enclosure for housing pumps 90–93 as well as wiring box assembly 65 and regulator and solenoid assembly 50. A bracket 66 is attached to the front side of the side walls 64 and is utilized to connect to the post 34 with suitable means such as screws (not shown). The lower housing assembly 60 is positioned to be below and adjacent the shell 30. A blender or mixer locator 67 extends outward from the front wall 63 and is generally planar to the base 61. The mixer locator 67 is utilized to locate the mixer or blender 190. A plurality of holes 67a and slots 67b are formed in the mixer locator 67. The purposes of the holes and slot is to provide locating holes for the rubber feet that are typically on the bottom of a mixer 190. The hole patterns are set up specifically for two different types of mixers. It is understood that other hole patterns would be utilized depending upon the specific mixer that is utilized. As can be seen in FIGS. 1a and 1b, the mixer locator 67 is at counter height and the mixer 190 would sit on the counter, on which the dispenser 10 is placed, with the mixer 190 feet extending through the holes 67a and slots 67b.

The wiring box assembly 65 has a back plate 65a. The wiring box assembly is positioned in the lower housing unit to the back left, as viewed in FIG. 2a. The regulator and solenoid assembly 50 has a back plate 50a and is positioned in the back right of the lower housing unit 60. The wiring box assembly 65 includes that which will be described more fully hereinafter with respect to FIG. 11. Similarly, the regulator and solenoid assembly 50 will be described more fully with respect to FIGS. 5 and 11. With the wiring box assembly 65 and regulator and solenoid assembly 50 in position, the back assembly 40 is placed on the liner 20. A tab 41b extends from the projection 41a. The tab 41b is positioned behind the back side member 68. The back assembly is then connected by suitable means, such as screws (not shown). It can be seen that the back plates 65a, 50a and projection 41a form a solid back to enclose the back of the lower housing unit 60.

Figure 8A:
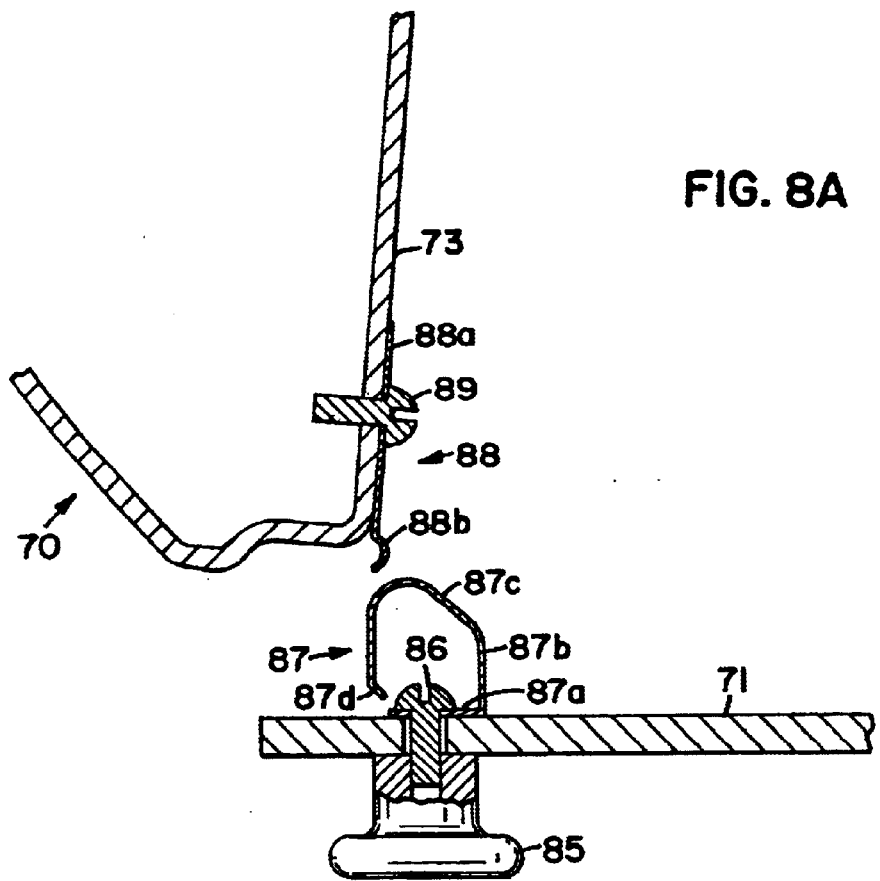
FIG. 8a is a top plan view of the mixer housing door showing the latch in an open position.
Figure 8B:
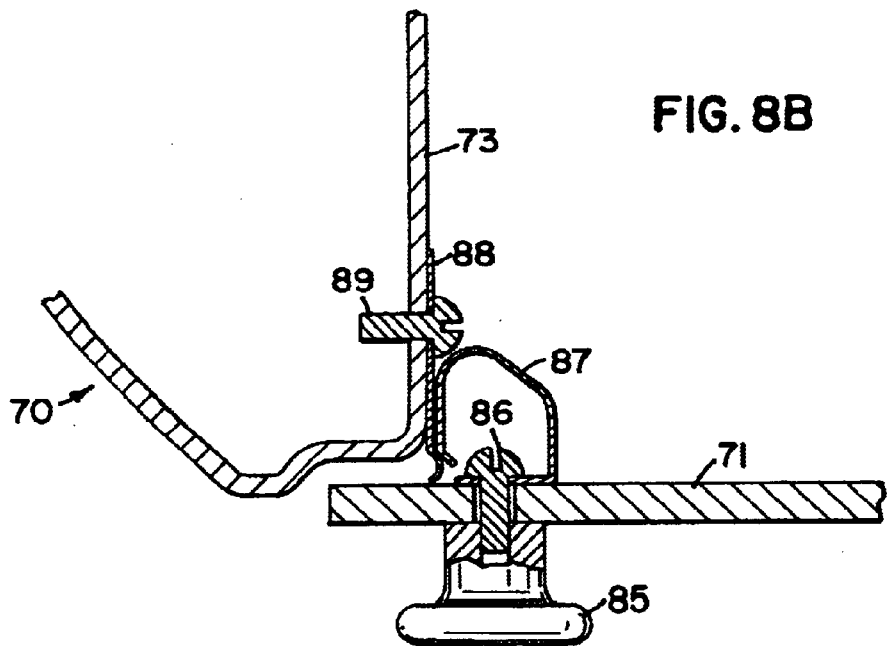
FIG. 8b is a top plan view of the mixer housing door showing the latch in a closed position.
Figure 12:
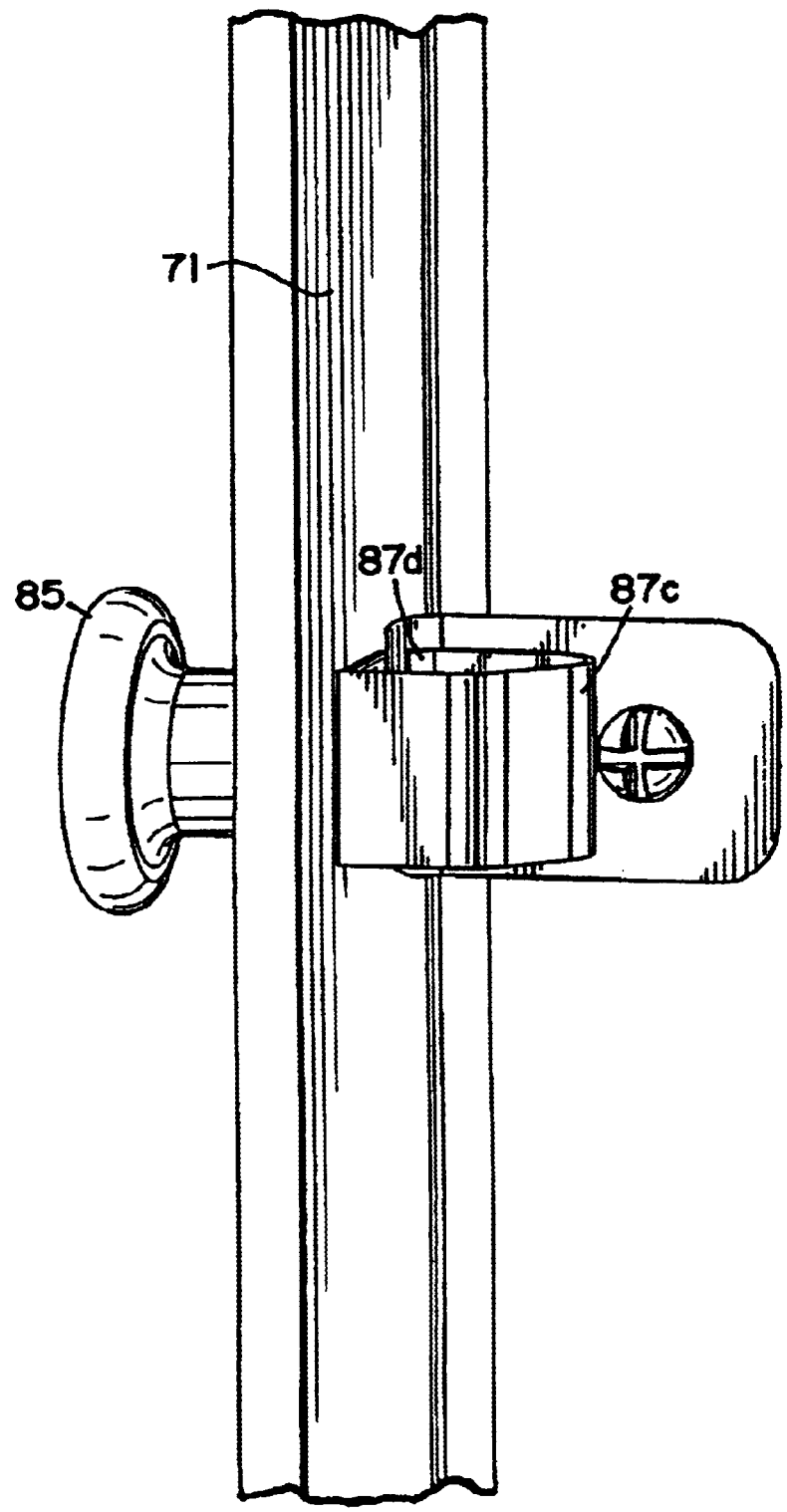
FIG. 12 is a perspective view, viewed generally from the side of the latch.

Referring to FIGS. 2b and 3, there is shown the mixer housing 70. FIG. 3 shows the mixer housing 70 without the door 71. The housing 70 has a top 72 operatively connected to first side 73 and second side 74, back 75 and front 76. This forms a cavity 77. As can be seen in the figures, the front 76 only extends approximately ⅓ of the way down the sides 73, 74 thereby creating an opening into the cavity 77. The housing 70 is pivotally connected to the shell 30 by hinges 78. The hinges 78 have one portion that is connected to the shell 30 and the other portion connected to the second side 74, thereby creating a pivoting housing. The hinges 78 may be any suitable hinge and preferably have an indentation to keep the housing in an open position when the housing is open. Latch 79 has one portion connected to the shell 30 and the other portion connected to the housing 70, to keep the housing in a closed position, when desired. The key pad 170 is mounted on the front 76 and the control board 160, as described more fully hereafter, is mounted behind the key pad 170, inside of the housing 70. The door 71 is connected to the housing 70 by hinges 79. This allows for the door 71 to pivot open and closed to allow access or to shut the access to the cavity 77. Referring now to FIGS. 8a and 8b, the mechanism for closing and latching the door 71 is shown. A knob 85 is secured to the door 71 by a screw 86. An easy clean latch 87 is also secured to the door 71 by the same screw 86. As seen in FIG. 8a, the latch 87 has a first leg 87a by which the latch 87 is secured to the door 71. Then a second leg 87b extends outward away from the door 71. A deflectable U-shaped section 87c is connected to the second leg 87b. The U-shaped section 87 will deflect to the right, as viewed in FIG. 8a. At the end of the U-shaped section 87 is an inwardly protruding tab 87d. As can be seen, the latch 87 has an open configuration. That is, there is nothing across the top or the bottom which would prevent the flow of water or cleaning solution through the latch when the dispenser 10 is being cleaned. Further, with no cover or bottom, there is not a surface on which any contaminants would be captured. A perspective view of the latch 87 is shown in FIG. 12. The retainer member 88 is a generally flat strip 88a that is secured to the first side 73 by a screw 89, or other suitable means. A semicircular member 88b is formed at one end and interacts with the U-shaped section 87c. As the door 71 is closed, the U-shaped section 87c will deflect to the right and then once the U-shaped section is passed, the semicircular member 88b springs back into position as shown in FIG. 8b and the tab 88 rests against the semicircular member 88b to retain the door in a closed position. The force of pulling on the knob in an outward direction will cause the U-shaped member again to deflect allowing the door 71 to open. The semicircular member 88b also has an open configuration so that a cleaning solution will also easily wash the surface. Similarly, there is no top or bottom cover to interfere with the cleaning process.

The ice bin 80 includes a base 81 and a cover 82. The cover 82 is shown exploded away in FIG. 2b and in position in FIG. 4. The base 81 includes a cavity 81a in which the ice is stored and which is insulated. Two side members 81a, 81b extend towards the rear of the unit and are sized and configured to have their inside surfaces be an extension of the inner sides 73, 74. A cover 82 is sized and configured to fit over the base 81 and has a door 82a that is pivotally mounted to the cover 82 by a hinge 82b. The door 82a is over the cavity 81a, thereby allowing access to the ice in the cavity 81a. The cover also has a curved left member 82c and a curved right member 82d that extend slightly upward from the cover 82. The curved members 82c, 82d are sized and configured to match with the shape of the housing 70, which sits on top of the cover 82.

Figure 9:
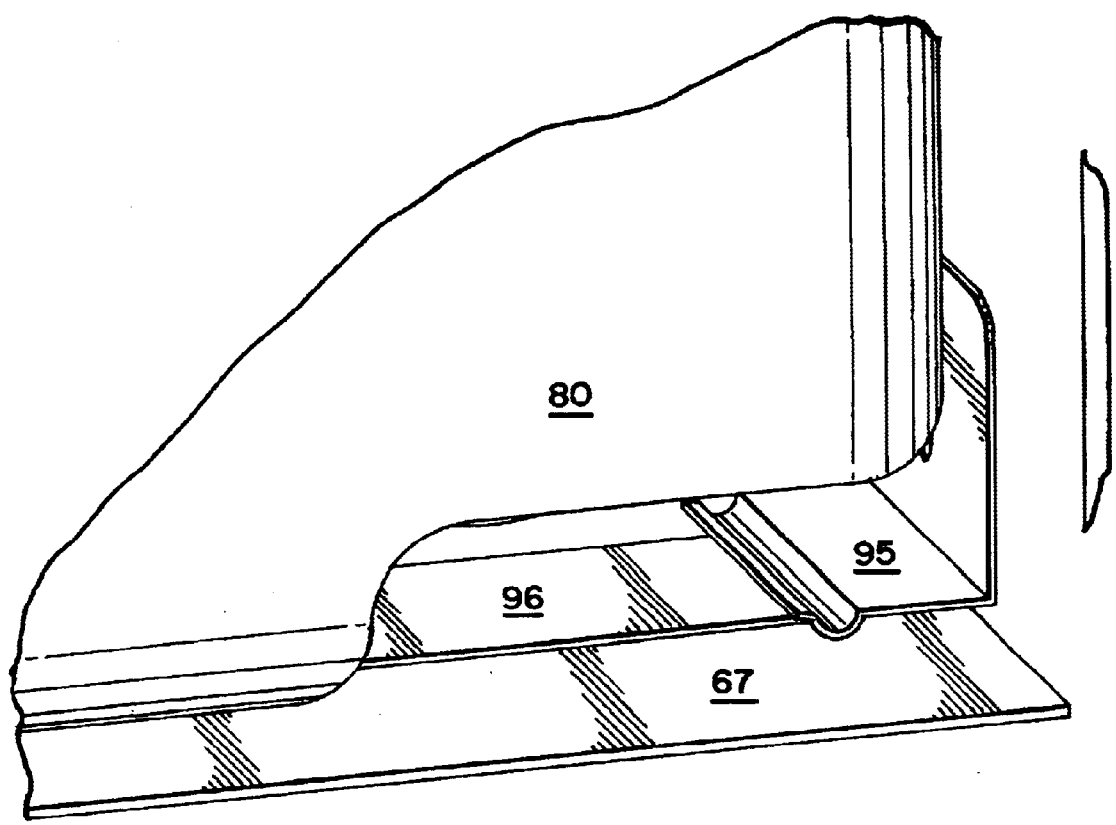
FIG. 9 is a partial perspective view of the ice box latch for the dispenser shown in FIG. 1.
Figure 10A:
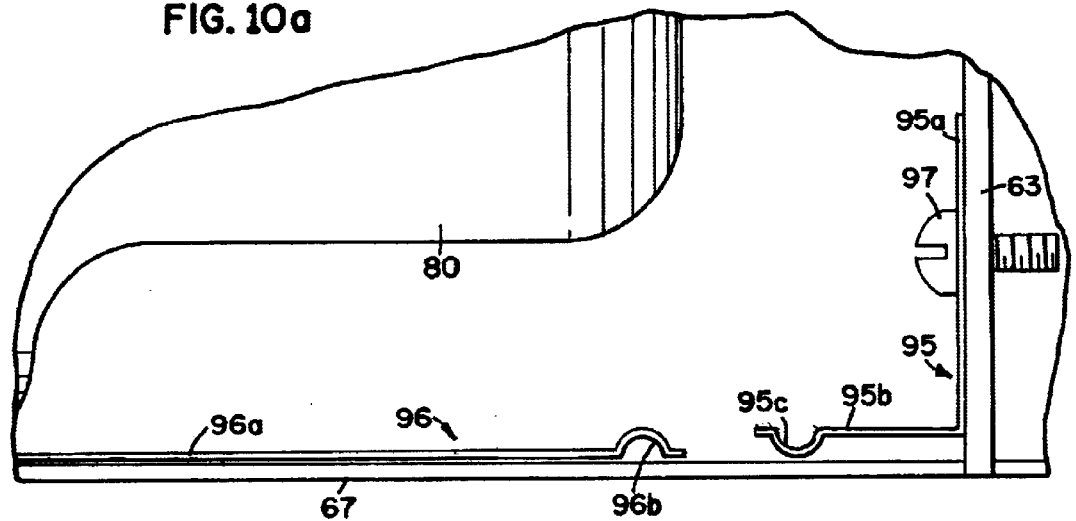
FIG. 10a is a partial side view showing the ice bin removed.
Figure 10B:
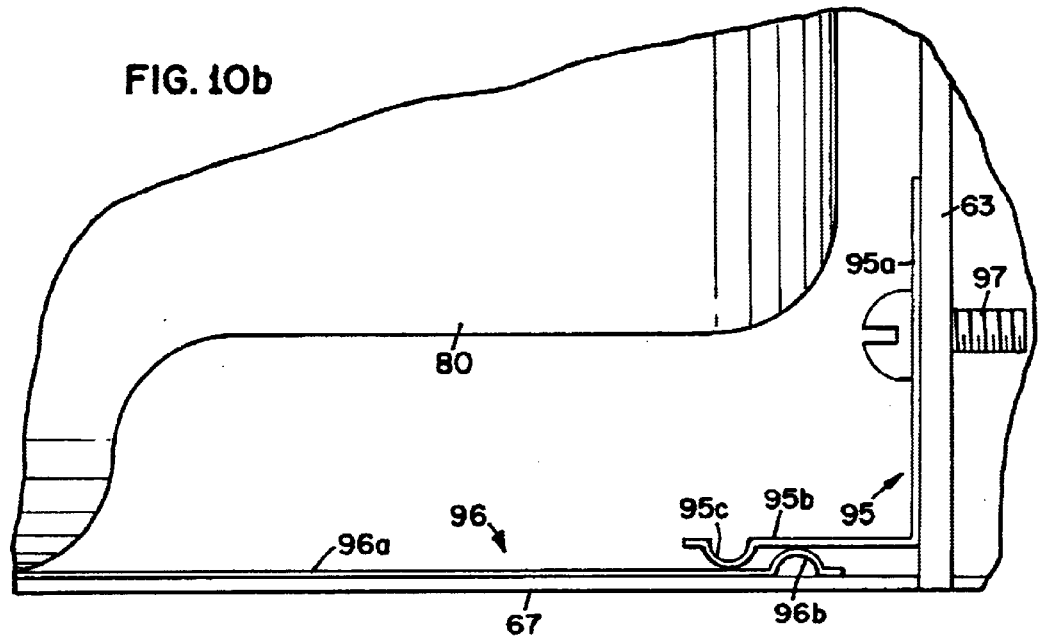
FIG. 10b is a partial side view showing the ice bin attached.

Referring to FIGS. 9, 10a and 10b, two retainer catches 95 are secured to the lower housing unit 60 and two retainers 96 are secured to the underside of the ice bin 80. The retainers 96 are spaced just inside of the sides of the ice bin 80 and since they are identical, only one will be described in detail. The retainer catch 95 is an L-shaped member having a first member 95a which is secured to the front wall 63 of the lower housing unit 60 by a screw 97 or other suitable means. A second leg 95b extends outward at approximately a 90 degree angle from the first leg 95a and has a concave end member 95c attached thereto. The second leg 95b acts as a spring. The retainer 96 has a first leg 96a and a convex end member 96b attached thereto. FIG. 10a shows the ice bin when it has been removed and the retainer catch 95 and retainer 96 are not engaged. This allows the ice bins 80 to be removed and taken to an ice cube storage location to refill the ice bin 80. To secure the ice bin 80 in position, the ice bin is slid forward and the retainer 96 moves on top of the mixer locator 67 until the convex end member 96b pushes upwards the concave end member 95c and passes underneath. Then, the second leg 95b springs back to the position shown in FIG. 10b and secures the ice bin 80 in location. The ice bin 60 is then easily releasably secured by the catches 95 and retainer 96 and it is only necessary to pull in or out to remove the ice bin 80.

The mixer or blender 190 may be any suitable mixer. The mixer 190 will typically have a base 191 and a mixing container 192. A mixing container 192 has a cover 193. The mixing container 192 is removable from the base 191. The base 191 is positioned on the locator 67. Further, the holes in the locator 67 provide for locating devices for the rubber feet that are on the bottom of the base 191. It is of course understood that the holes would vary depending upon the mixer 190 that is utilized.

Figure 5:
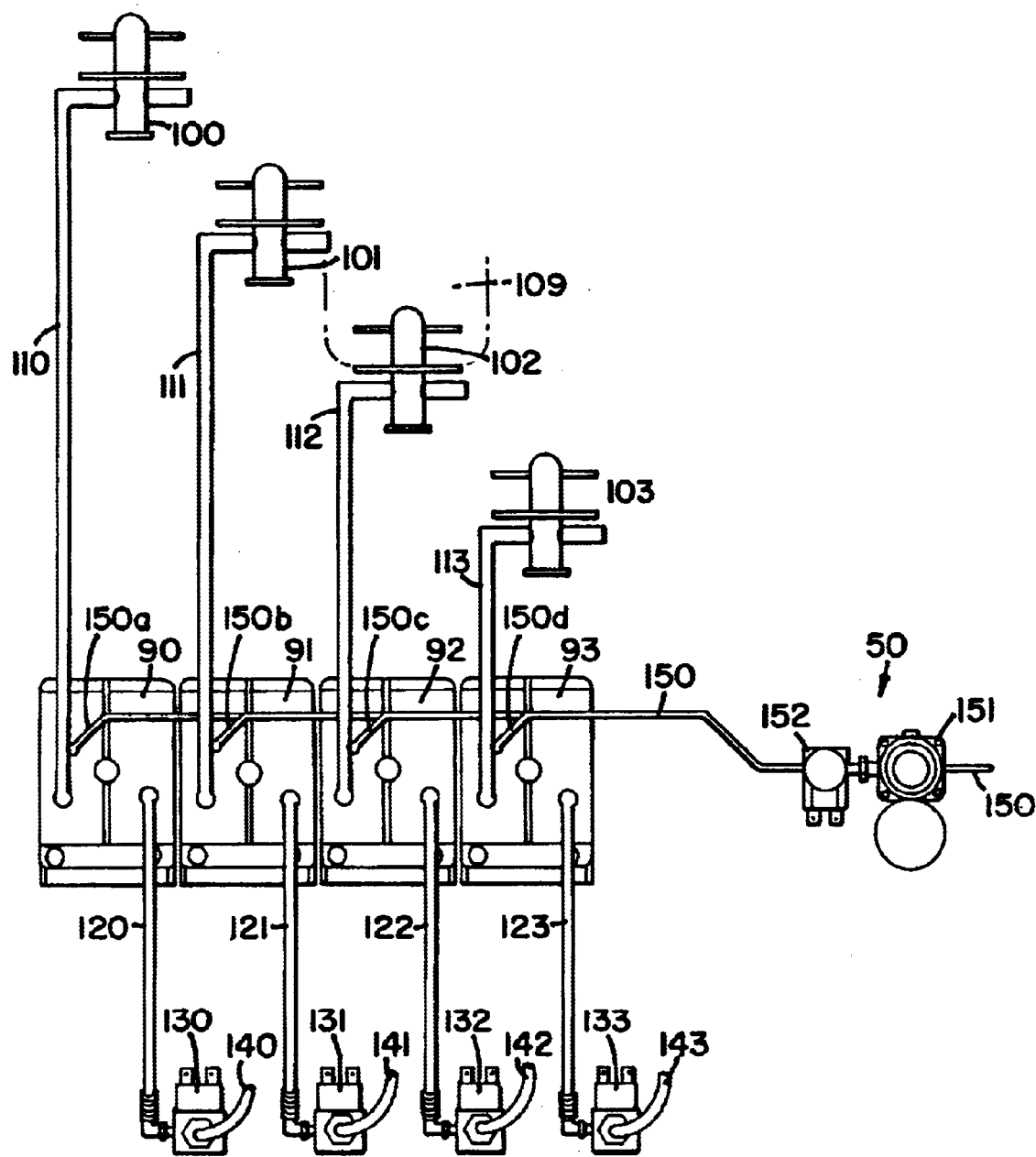
FIG. 5 is a schematic representation of the dispenser shown in FIG. 1 showing the flow of juice.

Referring now to FIG. 5, there is a general schematic showing the flow of the liquid in the dispensing station 10. A $CO_2$ supply line 150 is connected to the regulator valve 151. Any suitable supply of $CO_2$ may be utilized and connected to the supply line 150. A solenoid 152 is connected to the output of the regulator valve 151 and controls the flow of $CO_2$ through the supply line 150. The $CO_2$ is used to power the pumps 90–93. The supply line 150 has branches 150a–150d to power pumps 90–93. Four quick connect/disconnect valves 100–103 are connected by input hoses 110–113 to pumps 90–93. The quick connect/disconnect valves 100–103 may be any suitable valves such as Liqui-Box QCD. The valves 100–103 provide a quick connect and quick disconnect to bags 109 containing the liquid concentrate or juice that is used in making the drinks. Only a portion of one of the bags 109 is shown connected to quick connect/disconnect valve 102, it being understood that other bags, with different liquid concentrates, would be connected to the other quick connect/disconnect valves 100, 101, 103. The bags have a mating connection to match with the valves 100–103. Such bags and quick disconnects are well known in the art. The output of pumps 90–93 are connected via output hoses 120–123 to solenoids 130–133. The solenoids 130–133 are connected via dispensing tubes 140–143 and the dispensing tubes have their dispensing ends positioned in the housing 70 above the mixing container 192. The bags 109 are each placed on a separate tray 25, thereby holding four different liquid concentrates or juices. It is of course understood that the number of trays could vary depending upon the number of liquid concentrates that are desired. The hoses 110–113 are routed through the openings 26 and then out through the four holes 27, 28, 29 and 39, respectively and then on to the pumps 90–93. Hoses 140–143 are routed out of the rectangular slot 22 to their position on top of the mixing container 192, as previously described. The wiring from the pumps 90–93 and solenoids 130–133 are routed through the opening 23 and up to the control board 160.

It can therefore be seen that the dispenser 10 is a compact, self-contained dispensing station that is easily fit on a countertop. The ice is readily available from the ice bin 80 which is easily removable to be refilled at a remote location where ice is stored. The juice concentrate in the bags 109 is also stored in the station 10. As is the blender 190, which is stored in the housing 70. The unit also has the additional flexibility of having the ability to be converted to using larger or remote sources of liquid concentrate as so desired and not use the trays 25. The four holes 45 provide access ports for bringing in conduit to the pumps 93—93 if bags 109 are not utilized.

Figure 11:
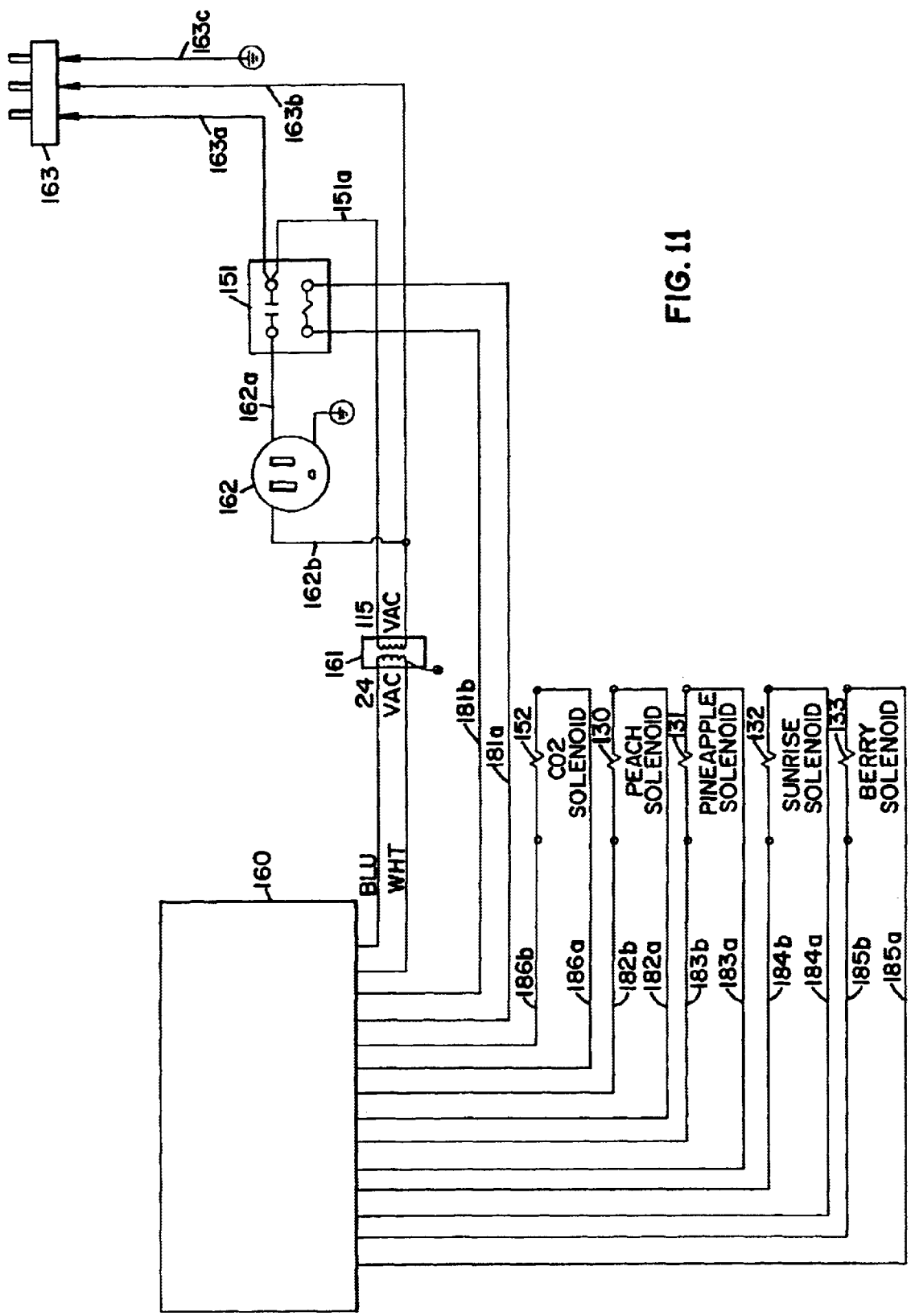
FIG. 11 is a general schematic for the dispenser shown in FIG. 1.

Referring to FIG. 11, a general schematic of the dispenser 10 is shown. A control board 160 is utilized to control the operation of the dispenser 10, as will be discussed more fully hereafter. The control board 160 may be any suitable programmable board available and well known in the art. The control board 160 is operatively connected to a key pad 170 with a plurality of keys to operate the control board 160, as is well known in the art. A plug 163 is connected to a suitable source of power, such as a 115 volt outlet. The plug 163 is connected via a transformer 161 to the control board 160. The transformer 161 converts the 115 volt AC to 24 volt AC. The control board 160 is connected to the regulator 151 by wires 181a, 181b. The control board 160 is connected to solenoids 130–133 by wires 182a, 182b–185a, 185b, respectively. The solenoid 152 is connected to the control board 160 by wires 186a, 186b. The plug 163 has three wires 163a, 163b, 163c. The wire 163c is connected to ground. The wire 163b is connected to the transformer 161 and the wire 163a is connected to the regulator valve 151. The regulator valve 155a is then connected to the transformer 161 by wire 151a. The transformer 151 is connected to the receptacle 162 by wire 162a. Wire 162b is connected to the receptacle 162 and the wire 163b. As will be discussed more fully hereafter, the operation of the dispenser 10 is then able to be controlled simply through the use of the key pad 170.

The key pad 170 has a key 171 for a first sized drink and key 172 for a second size drink, typically twice as large as the first drink. For instance, key 171 would be for a 12 ounce drink and key 172 for a 24 ounce drink, although other and/or additional sizes may be utilized. Keys 173–176 are for dispensing the four flavored juice concentrates, although other liquids may be used. Key 177 is for mixing and key 178 is for pulsing. Key 179 is the on/off key and key 180 is the calibration/cleaning key. The operation of the dispenser 10 is quite straightforward for the operator. The unit is turned on or off with the key 179. The size of the drink is selected by choosing either key 171 or 172. The dispensing liquid juice concentrate is chosen by picking one of keys 173–176. Ice is added to the mixer from the ice bin 80 and the mixing key 177 is then activated, wherein the mixer 190 will run for a preset time and automatically turn off at the end of the cycle. The pulse key 178 may be used to either pulse the mixer 190 or to add more concentrate. To add more concentrate, the pulse key 178 is depressed. Then the appropriate key 173–176 is pressed until the desired concentrate has been dispensed. The pulse key 178 is then released. To manually pulse the mixer 190, the pulse key is depressed. Then the mix key 177 is also depressed and the blender will run until the mixed key is released. The amount of concentrate dispensed can be calibrated. To do so, both the calibration key 180 and the pulse key 178 are depressed for four seconds. Then the appropriate flavor key 173–176 is held until the desired amount of concentrate is dispensed. As soon as the key is released, the controller 160 will store this information for the selected flavor. This step can be repeated until the proper amount has been dispensed. After the selected flavor has been calibrated, the operator presses and holds the calibration/clean key 180 for one second. This can then be repeated for the other flavors. The controller 160 will automatically double this for the second size drink 172 since it is twice the size.

To calibrate the blend time, the operator presses and holds both the calibration key 180 and the pulse key 178 for four seconds. The drink size 171, 172 that is desired to be calibrated is pushed. The operator then presses and holds the mix key for the desired amount of time. When the mix key 177 is released, the controller 160 will store the blend time for the drink size selected. After the blend time is calibrated, the calibration/clean key 180 is depressed for one second to end the calibration cycle. The controller 160 may also be supplied with factory settings. To reset to these default settings, the operator unplugs the unit 160 and presses and holds the calibration/clean key 180 and plugs the unit back in. When the unit is then turned on, the factory settings are in place.

The dispenser 10 may be easily cleaned. The calibration/clean key 180 may be utilized to send a cleaning solution through the lines after the liquid concentrate lines have been purged.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A self-contained juice dispensing station for use with a mixer, the station comprising:
    a) a liner having a cavity, the liner adapted and configured to hold a plurality of containers having a liquid, the liner having an open front;
    b) a mixer housing operatively connected to the liner, the housing proximate the open front of the liner and the mixer housing having a cavity for positioning mixer;
    c) an ice bin removably connected to the station; and
    d) a plurality of pumps positioned in the station for pumping liquid from the containers, thereby forming a self-contained ice cube/juice/mixer station.

2. The station of claim 1, further comprising a mixer locator operatively connected to the liner, the locator adapted and configured to locate a mixer.

3. The station of claim 1, further comprising:
    a) a plurality of quick connect/disconnect values are adapted and configured to be connected to the containers;
    b) the pumps being downstream of the quick connect/disconnect values;
    c) gas supply lines operatively connected to the pumps to power the pumps; and
    d) solenoids operatively connected downstream to the pumps to control flow of the liquid from the containers.

4. The station of claim 3, wherein the gas supply lines are $CO_2$ supply lines.

5. The station of claim 1, further comprising:
    a) a liner being a one piece thermoformed liner and having a plurality of shelf supports for holding the containers, formed on the liner's interior;
    b) a shell operatively connected to the liner's exterior; and
    c) the liner and shell bonded together with a solvent.

6. The station of claim 5, wherein the shell and liner are formed from ABS material.

7. The station of claim 1, further comprising:
    a) a first latch member operatively connected to the ice bin;
    b) a second latch member operatively connected to the station, wherein the first and second latch members provide for a slidable releasable connection for the ice bin.

8. The station of claim 1, further comprising:
    a) a door operatively connected to the mixer housing, providing access to the mixer cavity;
    b) a stainless steel door latch operatively connected to the door; and
    c) a stainless steel door catch operatively connected to the housing, wherein the door is releasably connected to the mixer housing.

9. The station of claim 8, further comprising the latch having an open configuration, wherein the latch may be cleaned without removal.

10. A self-contained juice dispensing station for use with a mixer, the station comprising:
    a) a liner having a cavity, the liner adapted and configured to hold a plurality of containers having a liquid, the liner having an open front;
    b) a mixer locator operatively connected to the liner, the locator adapted and configured to locate a mixer;
    c) a mixer housing operatively connected to the liner, the housing proximate the open front of the liner and the mixer housing having a cavity for positioning mixer;
    d) an ice bin removably connected to the station;
    e) a plurality of pumps positioned in the station for pumping liquid from the containers, thereby forming a self-contained ice cube/juice/mixer station;
    f) a plurality of quick connect/disconnect values are adapted and configured to be connected to the containers;
    g) the pumps being downstream of the quick connect/disconnect values;
    h) gas supply lines operatively connected to the pumps to power the pumps; and
    i) solenoids operatively connected downstream to the pumps to control flow of the liquid from the containers.

11. The station of claim 10, further comprising:
    a) a liner being a one piece thermoformed liner and having a plurality of shelf supports for holding the containers, formed on the liner's interior;
    b) a shell operatively connected to the liner's exterior;
    c) the liner and shell bonded together with a solvent;
    d) a first latch member operatively connected to the ice bin;
    e) a second latch member operatively connected to the station, wherein the first and second latch members provide for a slidable releasable connection for the ice bin;
    f) a door operatively connected to the mixer housing, providing access to the mixer cavity;
    g) a stainless steel door latch operatively connected to the door; and
    h) a stainless steel door catch operatively connected to the housing, wherein the door is releasably connected to the mixer housing.

* * * * *